United States Patent
Reijonen et al.

[11] 3,899,086
[45] Aug. 12, 1975

[54] APPARATUS FOR REMOVING CHEESES FROM CHEESE MOULDS

[75] Inventors: Oiavi Reijonen; Lauri Kostiainen, both of Helsinki, Finland

[73] Assignee: MKT-Techtaat OY, Helsinki, Finland

[22] Filed: June 5, 1973

[21] Appl. No.: 367,223

[52] U.S. Cl. .................. 214/1 Q; 99/644; 214/310; 214/152
[51] Int. Cl. ............................................ B65g 65/04
[58] Field of Search ........ 198/106, 75, 92; 426/512, 426/518; 99/644; 104/172, 173, 176; 214/1 Q, 312, 314, 310, 152

[56] References Cited
UNITED STATES PATENTS

| | | | |
|---|---|---|---|
| 1,567,346 | 12/1925 | Tunison et al. | 214/16.1 DB |
| 1,577,535 | 3/1926 | Nishio | 214/310 |
| 2,651,087 | 9/1953 | Fellows | 214/1 Q |
| 3,129,829 | 4/1964 | Ferguson | 214/314 |
| 3,300,064 | 1/1967 | Baer | 214/314 |
| 3,308,977 | 3/1967 | Cochran et al. | 214/310 |

Primary Examiner—Robert J. Spar
Assistant Examiner—Lawrence J. Oresky
Attorney, Agent, or Firm—Toren, McGeady and Stanger

[57] ABSTRACT

Apparatus for removing cheeses from rectangular, large cheese moulds lying side by side, in which moulds the bottom is composed of rectangular parts and one end of the mould has been constructed to constitute a door, through which the bottom parts of the mould and the cheese bolster resting thereupon can be extracted from the mould by the aid of a traction member, such as a rope or chain, the traction member being attached, on one hand, to one or several bottom parts and on the other hand to a winch constructed to be a carriage transportable from one cheese mould to another and having a tray for receiving one cheese at a time. In front of the cheese moulds there is a track for the winch carriage and that beside this track there is a conveyor, running parallel with same, for the cheeses, and the tray for receiving the cheeses on the winch carriage has been constructed as a lever turnable about its shaft and which upends the cheese together with the accompanying bottom part and drops them onto a table on the winch carriage or directly onto the cheese conveyor.

4 Claims, 4 Drawing Figures

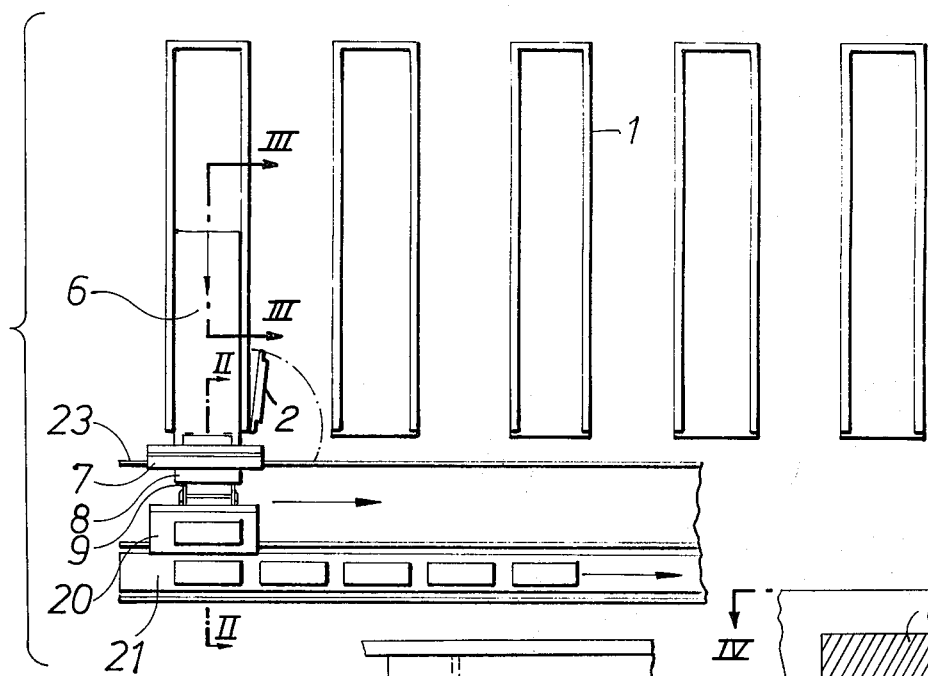
FIG. 1
FIG. 3
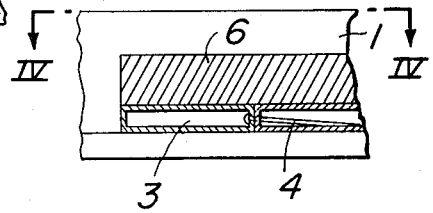
FIG. 4
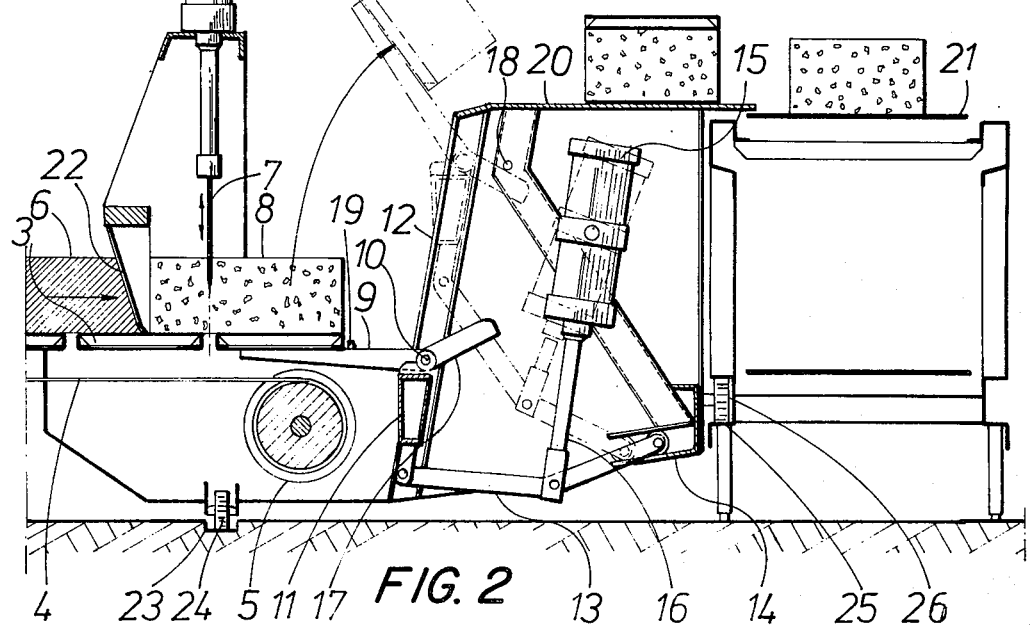
FIG. 2

3,899,086

APPARATUS FOR REMOVING CHEESES FROM CHEESE MOULDS

SUMMARY OF THE INVENTION

The present invention concerns an apparatus for removing cheeses from rectangular, large cheese moulds parallelly disposed, in which moulds the bottom is composed of rectnagular parts and one end has been formed to constitute a door, through which the bottom parts of the mold and the cheese bolster resting on these can be extracted with the aid of a traction means, such as e.g. a rope or chain, which traction means has been attached, on one hand, to one or several bottom parts and on the other hand to a winch, which has been constructed to be a carriage transportable from one cheese mould to another and has a depository for receiving one cheese at a time.

An apparatus of this kind is known in prior art from the Austrian Pat. No. 282.248, for instance. The aim of the present invention is to further develop the apparatus of prior art in such manner that it can be made faster in its operation and such that it requires fewer persons for its operation.

The invention is characterized in that in front of the cheese moulds there is a track for the winch carriage and that beside this track there is, running prallel with same, a conveyor for the cheeses, and that the depository in the winch carriage provided for receiving the cheese is shaped as a lever turnable about its axis and which upends the cheese together with the bottom part following along with it and deposits it on a tray in the winch carriage or directly on the cheese conveyor.

The winch carriage comprised in the apparatus according to the invention is now positively confined to its track. As a result, it is a considerably more easy task, compared with the apparatus of prior art, to direct it into an appropriate position in front of the particular mould which one desires to empty, while in the prior apparatus the winch carriage was freely moved about on the floor. It is not necessary in the case of the apparatus according to the invention to specifically secure the winch carriage in contiguity with the mould to be emptied, because the track prevents any displacement of the winch carriage in the direction away from the mould. In the apparatus of prior art, however, a particular securing device was necessary, by means of which the winch was connected with the door-side end of the mould.

In the apparatus of prior art, the bottom part of the mould and the cheese resting thereupon were pulled onto a tray upon the winch, whence the bottom part and the cheese were removed by the aid of a truck. Thereby the removal of cheeses was tied in with the rate of operation of the truck. According to the present invention, however, the apparatus comprises a conveyor parallel with the track of the winch carriage and the capacity of which is a multiple of that of the truck.

In the apparatus according to the invention also inversion of the cheese takes place so that the bottom part comes to lie upon the cheese. From here it is easily removable. In the apparatus of prior art, however, the flipping over of the cheese and removal of the bottom part were carried out at a later stage in the process.

An advantageous embodiment of the invention is characterized in that the depository together with its shaft has been mounted on a slide movable along vertical guides and which in the course of its upward motion, at first, lifts the depository and the cheese resting thereupon along with it and, close to the end of its travel, compels the depository to turn over. It is achieved by the aid of this lifting motion that the cheese is raised up to normal working level from the level of the mould bottom, which is close to the floor.

BRIEF DESCRIPTION OF THE DRAWING

The invention is described hereinbelow by the aid of an example with reference to the attached drawing, wherein FIG. 1 shows moulds disposed side by side and an apparatus according to the invention, as seen from above; FIG. 2 shows the section along the line II—II of FIG. 1; FIG. 3 shows the section along III—III of FIG. 1; and FIG. 4 shows the section along IV—IV of FIG. 3.

DETAILED DESCRIPTION OF THE INVENTION

In FIG. 1, five rectangular, large cheese moulds 1 lying side by side have been presented, which may have a length e.g. of 5 to 6 metres. Each mould 1 has at one end a swing door 2. In FIG. 1 the swing door 2 of the leftmost mould has been opened and the mould is being emptied by the aid of the apparatus according to the invention.

On the bottom of each mould 1 there is a number of consecutive, rectangular bottom parts 3, which may slide in the longitudinal direction of the mould. These bottom parts as well as the walls of the mould are so constructed that the whey may flow off through them. To the bottom part lying farthest away from the door 2 a rope 4 has been affixed, which runs under the bottom of the mould and is taken up by the rop drum 5 of a winch. When the winch is used to exert a pull on the bottom part which is farthest away from the door, the other bottom parts are correspondingly pushed in the forward direction. the connection of the rope 4 with the bottom part is shown in FIGS. 3 and 4.

The cheese bolster 6 rests upon the bottom parts 3. As seen in FIG. 2, the cutting device 7 is detaching one cheese 8 from the cheese bolster. The cut is performed to pass where two of the bottom parts 3 abut. During this procedure, the cheese 8 that is being detached and the respective bottom part lie on a tray 9, consisting of two parallel arms, in the winch carriage. The arms 9 are journalled by means of a shaft 10, which in its turn is carried on a slide 11. The slide 11 has rollers at its upper and lower ends, whereby the slide is easily movable along vertical guides 12. The arms 9 are so braced against the slide that they cannot turn counterclockwise in FIG. 2. The lower end of the slide 11 is connected with a pivoted arm 13, which has its opposite end connected with a fork 14 on the winch carriage and provided with a travelling roller. The pivoted arm 13 is connected about its middle with the free end of the piston rod 16 of a power cylinder 15. The power cylinder 15 is swivel-mounted on the body of the winch carriage.

In order to transport the cheese 8 detached from the cheese bolster 6 away from the position of FIG. 2, pressure is applied under the piston in the power cylinder, whereby the piston rod 16 moves the pivoted arm so that the slide 11 rises along the guide 12. Close to the upper extreme position of the slide 11, the extensions 17 of the arms 9 encounter a stop 18 on the body of the winch carriage, whereby the arms 9 begin to turn about their shaft 10. This intermediate position is indicated by dot-and-dash lines in FIG. 2. On the arms 9 a limiting stop 19 has been provided, which prevents the cheese and the bottom part lying under same from slipping along the arms 9. After reaching a given point, the cheese together with the bottom part tips over and falls down on the table 20 in the upper part of the winch carriage. The bottom part, which now lies on top of the cheese, may be removed immediately herafter. Subsequently, the cheese is pushed onto the conveyor 21. The slide 11 is returned into its working position by means of the power cylinder 15. The pulley 5 of the winch is actuated so as to move the cheese bolster forward a distance corresponding to the length of one bottom part, up to the stop 19. During the movement of the cheese bolster 6 this is sliced in longitudinal direction by the knife 22. The knife 22 is not absolutely indispensable. On the other hand there may be several such knives. After the movement of the cheese bolster has stopped, the process sequence described begins once again.

It is obvious to one skilled in the art that different embodiments of the invention may vary within the scope of the patent claims presented below. It was said that the cheese 8 drops from the arms 9 onto the table 20. But the apparatus may equally be arranged to drop the cheese 8 directly onto the conveyor 21.

As shown in the drawing, the cutter 7 has been fitted on the winch carriage, but the cutter may equally be mounted on the mould 1, at its door-side end. On the other hand, the cutter may be arranged to be movable along the mould, in which instance it divides the cheese bolster 6 into cheeses 8 before one begins to pull the cheese bolster from the mould.

After the mould has been emptied, the winch carriage is moved on its track to be opposite the next mould. As shown in the drawing, one track member of the track consists of a guiding groove 23 in the floor, intended for the wheel 24, and the second track member is a guiding trough 25 for the wheel 26, provided on the frame of the conveyor 21.

We claim:

1. Improvement in an apparatus for removing cheeses from rectangular, large cheese molds lying side by side, in which moulds the bottom is composed of rectangular plates and one end of the mould has been constructed to constitute a door through which the bottom plates of the mould and the cheese bolster resting thereupon can be extracted from the mould by the aid of a traction member such as a rope or chain, said traction member being attached at one end to the plate furthest from said door and at the other end to a winch constructed to be a carriage transportable from one cheese mould to another and having a tray for receiving one cheese at a time, wherein the improvement comprises a track for the winch carriage located in front of the cheese moulds, a conveyer for the cheeses beside said track and running parallel therewith, said tray mounted on said carriage and comprising a lever and a shaft turnably mounting said lever which upends the cheese together with the accompanying bottom plate and drops them onto a supporting surface on the winch carriage or directly onto the cheese conveyer.

2. The improvement according to claim 1, wherein said carriage comprises a slide and vertical guides for movably guiding said slide, said slide mounting said tray through said shaft so that in its upward motion it first raises the tray and the cheese resting thereupon, and near its end of travel forces the tray to turn.

3. The improvement according to claim 2, wherein said tray comprises a two-armed lever, one arm of which supports the cheese, and said carriage comprises a stop mounted in the path of travel of the other arm so that as said other arm hits said stop, the tray is pivoted about said shaft and causes the cheese supported thereupon to upend onto said supportive surface.

4. The improvement according to claim 2, wherein said carriage comprises a power cylinder pivotally mounted on said carriage, a pivoted arm having one end attached to said slide and its other end to said carriage, said pivoted arm connected at a mid-portion thereof to one end of said power cylinder so that said power cylinder, when activated, will cause said slide to move.

* * * * *

UNITED STATES PATENT OFFICE
CERTIFICATE OF CORRECTION

Patent No. 3,899,086          Dated August 12, 1975

Inventor(s) OLAVI RIJONEN and LAURI KOSTIAINEN

It is certified that error appears in the above-identified patent and that said Letters Patent are hereby corrected as shown below:

In the heading of the patent, insert

--[30] Foreign Application Priority Data

June 7, 1972    Austria............... 4901/72 --.

Signed and Sealed this

Second Day of November 1976

[SEAL]

*Attest:*

RUTH C. MASON
*Attesting Officer*

C. MARSHALL DANN
*Commissioner of Patents and Trademarks*